(12) United States Patent
Kalkbrenner (10) Patent No.: US 10,895,732 B2
(45) Date of Patent: Jan. 19, 2021

(54) MICROSCOPY METHOD FOR DETERMINING A CONTRAST IMAGE AND MICROSCOPE

(71) Applicant: Carl Zeiss Microscopy GmbH, Jena (DE)

(72) Inventor: Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 373 days.

(21) Appl. No.: 15/774,493

(22) PCT Filed: Nov. 4, 2016

(86) PCT No.: PCT/EP2016/076671
§ 371 (c)(1),
(2) Date: May 8, 2018

(87) PCT Pub. No.: WO2017/080921
PCT Pub. Date: May 18, 2017

(65) Prior Publication Data
US 2020/0264422 A1 Aug. 20, 2020

(30) Foreign Application Priority Data
Nov. 9, 2015 (DE) .......... 10 2015 221 991

(51) Int. Cl.
*G02B 21/36* (2006.01)
*G02B 21/08* (2006.01)
(Continued)

(52) U.S. Cl.
CPC .......... *G02B 21/367* (2013.01); *G02B 21/086* (2013.01); *G02B 21/14* (2013.01);
(Continued)

(58) Field of Classification Search
None
See application file for complete search history.

(56) References Cited

U.S. PATENT DOCUMENTS 6,317,259 B1 11/2001 Matsui
2009/0290156 A1* 11/2009 Popescu .............. G02B 21/008
356/338

(Continued)

FOREIGN PATENT DOCUMENTS

DE 102 45 974 A1 4/2004
DE 10 2007 047 466 A1 4/2009
(Continued)

OTHER PUBLICATIONS

Concise Explanation of the International Preliminary Report on Patentability and Written Opinion of International Searching Authority.

*Primary Examiner* — Lindsay J Uhl
(74) *Attorney, Agent, or Firm* — Duane Morris LLP (57) ABSTRACT

A microscopy method, and a microscope for carrying out the method, in which an illumination radiation is directed through an object arranged in an object plane of a microscope, in order to image the object, image data of a first image of the object being acquired with a first configuration of the microscope and image data of a second image of the object being acquired with a second configuration of the microscope. Differences between the image data of the first image and the second image are determined and, in dependence on the determined differences, image data of a contrast image of the object is provided. In the first configuration, a phase mask that has at least one optical gradient transversely in relation to the optical axis of the microscope, by the effect of which a phase gradient of the illumination radiation passing through the phase mask is produced or can be produced, is arranged in an objective pupil of the micro- (Continued)

scope and, in the second configuration, the phase mask is removed from the objective pupil.

14 Claims, 9 Drawing Sheets (51) Int. Cl.
*G02B 21/14* (2006.01)
*G06T 3/40* (2006.01)
*H04N 5/225* (2006.01)
*H04N 7/18* (2006.01)

(52) U.S. Cl.
CPC ............. *G06T 3/40* (2013.01); *H04N 5/2254* (2013.01); *H04N 5/2256* (2013.01); *H04N 7/18* (2013.01)

(56) References Cited

U.S. PATENT DOCUMENTS

| | | | |
|---|---|---|---|
| 2014/0104407 A1 | 4/2014 | Ouchi | |
| 2015/0168702 A1 | 6/2015 | Harris | |
| 2016/0171679 A1* | 6/2016 | Ishiwata | G02B 21/18 348/46 |
| 2016/0202178 A1* | 7/2016 | Acosta | G01J 3/18 356/303 |

FOREIGN PATENT DOCUMENTS

| | | |
|---|---|---|
| DE | 10 2007 058 558 A1 | 6/2009 |
| EP | 2 645 146 B1 | 7/2014 |

* cited by examiner

Prior art

MICROSCOPY METHOD FOR DETERMINING A CONTRAST IMAGE AND MICROSCOPE

RELATED APPLICATIONS

The present application is a U.S. National Stage application of International PCT Application No. PCT/EP2016/076671 filed on Nov. 4, 2016 which claims priority benefit of German Application No. DE 10 2015 221 991.7 filed on Nov. 9, 2015, the contents of each are incorporated by reference in their entirety.

FIELD OF THE INVENTION

The invention relates to a microscopy method for determining a contrast image according to the preamble of claim 1 and to a microscope according to the preamble of claim 8.

BACKGROUND OF THE INVENTION

In order to be able to image low-contrast objects, particularly in light-optical microscopy, a phase-contrast method or a method of differential interference contrast (DIC) have been, for example, used. These require the arrangement of two expensive Wollaston or Nomarski prisms and two polarizers in the beam path. Moreover, a number of optical elements have to be introduced both into the illuminating beam path and the imaging beam path, making it more difficult for such a microscope to be flexibly used in combination with other methods, such as fluorescence microscopy.

EP 2 645 146 B1 discloses a method for recording images with a light microscope in which illumination light is directed onto a specimen and a diaphragm for cutting the illumination light is brought into a beam path of the illumination light. In a first diaphragm setting, one portion of the cross-sectional area of the beam path is covered, in a second diaphragm setting, a second portion is covered. With each of the diaphragm settings, an image is recorded, and the images are computationally combined to create a contrast image. In this case, the method serves the purpose of compensating for restrictions of a cross-sectional region of the illumination light that are caused by walls of a specimen vessel containing the specimen. The diaphragms can be pivoted into the beam path by means of a diaphragm motor. EP 2 645 146 B1 also discloses a light microscope which is designed for carrying out the method and has diaphragms that can be pivoted into the beam path.

SUMMARY OF THE INVENTION

The invention is based on the object of proposing a microscopy method that is improved in comparison with the prior art. The invention is also based on the object of proposing a microscope that is improved in comparison with the prior art.

These, and other objects of the invention, are achieved with respect to the microscopy method by the features of independent claim 1, and respect to a microscope, the object is achieved by the features of independent claim 8.

Advantageous embodiments are the subject of the dependent claims.

In the case of the microscopy method, illumination radiation is directed onto an object arranged in an object plane of a microscope, in order to image the object by means of an object radiation obtained from the object plane. In this case, image data of a first image of the object are acquired with a first configuration of the microscope and image data of a second image of the object are acquired with a second configuration of the microscope. Differences between the image data of the first image and the second image are determined. In dependence on the determined differences, for example absolute differences, image data of a contrast image of the object are provided.

A microscopy method according to the invention provides that, in a first configuration, a phase mask that has an optical gradient transversely in relation to the optical axis of the microscope is arranged in a pupil of the microscope. By the effect of the phase mask, a phase gradient of the object radiation is, or can be, produced. In a second configuration, the phase mask is removed from the pupil. The microscopy method according to the invention is therefore carried out with the first configuration and the second configuration of the microscope.

The object radiation may be changed or have been changed with respect to its phase and/or its amplitude, which for simplicity is summarized by the term phase gradient, by the effect of the phase mask.

The object radiation is understood as meaning both a portion of the illumination radiation which has passed through the object and has interacted with the object and by which the object has possibly been changed and also a portion of the illumination radiation which has not passed through the object but is obtained from the object plane. The object radiation is illumination radiation that is obtained, for example acquired and/or collected, from the object plane.

The microscopy method is a transmitted-light microscopy method in which at least a portion of the illumination radiation passes through the object and is acquired as object radiation.

The object is for example a specimen in the form of a biological preparation, for example a tissue, a cell and/or a cell organelle.

The object radiation may have a phase gradient if the object itself has an optical gradient, or an optical gradient of the object has been brought about by its dimensions, local phase differences, changes in the refractive index and/or by the material composition.

The image data are preferably acquired in a spatially resolved form, in that in each case they are assigned or can be assigned to a point and/or a region of the object plane. The individual image data may for example be represented on a display as image elements (pixels, picture elements) of an image.

In the pupil of the microscope there is a Fourier transform of an image of the object plane.

The phase mask is an optical element by the effect of which the phase and/or the amplitude of the radiation passing through the phase mask, in particular the object radiation, is, or can be, changed.

The optical gradient of the phase mask is for example formed by the phase mask having a changing thickness and/or a changing refractive index transversely in relation to the optical axis. The thickness may in this case actually change, for example increase or decrease. In further embodiments it may also change in the sense, for example, of an increasing or decreasing optical thickness.

By the effect of the phase mask, in particular by the effect of the optical gradient of the phase mask, a phase gradient of the object radiation passing through the phase mask is produced or can be produced. The object radiation passing through the phase mask, in the region of the optical gradient, has a gradient of its phase and/or amplitude (phase gradient) at least in a direction transverse to the optical axis.

In the second configuration of the microscope, the phase mask is removed from the pupil. In this case, the phase mask may have actually been physically removed or the optical effect of the phase mask stopped, at least with respect to the object radiation.

With the second configuration of the microscope, image data of a wide field image are acquired. These image data can be compared with the image data that contain the phase gradient caused by the phase mask and the differences can be determined. The wide field image is in this case used as a reference for an uninfluenced image or for uninfluenced image data.

The differences between the image data may be determined as absolute differences. In further embodiments, they may also be determined as relative differences in the form of relationships or percentages. It is also possible that the differences are determined in some other form suitable for the application of the microscopy method according to the invention.

In order to compensate for absorption losses, in a further embodiment of the microscopy method the image data of the first and second images are normalized and/or scaled. In this case, for example, absorption losses occurring in the phase mask are compensated.

In a further embodiment of the microscopy method, an inverse contrast image is produced, in particular calculated, in dependence on the determined absolute differences of the image data. In the case of an inverse contrast image, the light-dark distributions are shown conversely to in the case of a contrast image.

The optical gradient of the phase mask is advantageously selected in dependence on optical properties of the object and/or of the optical system, whereby a quality of the contrast image that corresponds to the intended application can be achieved.

In further embodiments of the microscopy method, it is possible that image data of a number of first and/or second images are acquired. Selected first and second images may be used for determining the differences. It is also possible to correct the first and/or second images before the determination of the differences, for example to dampen intensity peaks or discard images.

The microscopy method according to the invention may be advantageously combined with further imaging methods, in particular with further microscopy methods. In an advantageous embodiment, the acquisitions of the image data are performed by means of the first configuration and second configuration in alternation with a number of acquisition processes that are carried out with a third configuration of the microscope. Such a third configuration of the microscope is for example a fluorescence acquisition and/or an acquisition process in which no transmitted light is acquired.

In one possible embodiment, the microscopy method may be used to carry out an analysis of the state of the object in dependence on the image data of the contrast image. For this purpose, at least one subset of the image data of the contrast image is compared with target data. The comparison process is preferably carried out automatically, and may for example be performed by superposing, overlaying and/or displaying the target data on a display, preferably together with acquired actual data. A comparison of the target data with the actual data is possible visually, but may also be performed by comparing and assessing the deviations of the target data and the actual data in an automated manner using a suitable algorithm.

Such a state analysis may advantageously be combined with carrying out the further imaging process. For example, after a number of acquisition processes by means of the third configuration, the state of the object may be checked, in that image data are acquired by means of the first configuration and the second configuration and image data are determined by means of a contrast image and the at least one contrast image is evaluated.

If, in such a state analysis, for example an unwanted or excessively advanced degeneration of the object is found, the acquisition processes to be carried out subsequently by means of the third configuration can be correspondingly modified or further acquisition processes prevented, in order for example to save time and costs.

The object is also achieved by a microscope. The microscope comprises a light source for providing an illumination radiation, a condenser for focusing the illumination radiation in an object plane, an objective unit for collecting and imaging object radiation obtained from the object plane in the direction of an optical axis of the microscope in an image-side pupil; an imaging unit for imaging the object radiation in an image plane and an acquisition unit for the spatially resolved acquisition of image data in the image plane.

A microscope according to the invention is characterized in that a phase mask is arranged in the pupil or there is an infeeding device designed for moving the phase mask in and out of the pupil, the phase mask having at least one optical gradient, which is formed transversely in relation to the optical axis and by the effect of which a phase gradient of the object radiation is produced or can be produced.

The objective unit and the imaging unit consist in each case of at least one optical lens.

In a further possible embodiment of the microscope, at least two phase masks are held in a changing device, can be individually selected and can be moved in and out of the pupil by means of the infeeding device. Such a changing device makes it possible for phase masks with optical gradients of different degrees and/or different direction(s) of the optical gradients to be selected and used flexibly.

In further embodiments, the phase mask is divided into subregions and at least one of the subregions has a gradient that deviates in comparison with the other subregions. The division of the phase mask is advantageously performed symmetrically. Such an embodiment reduces the emphasis of the phase gradient in a specific direction, as occurs for example in the case of the method of differential interference contrast, also referred to there as the "shearing direction".

The phase mask may be rotatable about an axis of rotation running parallel to the optical axis, whereby the aforementioned directional emphases of the phase gradient is likewise reduced or even avoided. A mounting of the phase mask located in the pupil is then designed for the rotation, preferably controlled rotation, of the phase mask.

The phase mask is for example formed as an element that is transparent to the object radiation, such as a wedge, a double wedge or a differently shaped element.

In further possible embodiments of the microscope, the phase mask is formed by tilted mirror surfaces of at least two mirrors and/or by a deformable mirror. It may also be formed as a liquid crystal element or a spatial light modulator. The deformable mirror, the liquid crystal element or the spatial light modulator are advantageously adjustable, in order to bring about different optical gradients and also in order possibly to set or adjust a desired optical gradient.

In a further embodiment, the microscope has an evaluation unit for evaluating the image data acquired by the acquisition unit, the evaluation unit being designed, in particular configured, for determining differences of radiation values between at least one data set acquired with the phase mask arranged in the pupil and a reference data set acquired without the phase mask arranged in the pupil.

The microscopy method according to the invention can be carried out with little effort. Moreover, on the equipment side, the microscope only has to be modified slightly, since only one optical element, that is the phase mask, has been introduced or is to be introduced into the beam path.

The method is edge-selective and makes possible an improved resolution of the contrast image in comparison with the prior art. Furthermore, the optical cutting (sectioning) is improved with respect to the achievable resolution.

The specific positioning of the phase mask in relation to the pupil may be affected by tolerance, without significantly influencing the function of the microscope and the feasibility of the method.

Because of the arrangement of the phase mask in the pupil, no signal loss occurs, as is disadvantageously the case in the solutions according to the prior art. Thus, in the case of the half-pupil approach described in EP 2 645 146 B1, portions of the transmitted light, that is to say of the object radiation, are suppressed.

In the case of the embodiment of the microscopy method according to the invention, the entire numerical aperture is used for producing the image data of each image, whereas in the case of the half-pupil approach according to the prior art only half the numerical aperture can be used. Because of the use of the entire numerical aperture, the resolution and contrast are better than with the half-pupil approach.

The microscopy method according to the invention makes possible a simplified visualization of low-contrast objects in microscopy, for example in addition to imaging by means of a fluorescence method. For example, in transmitted light the object, for example cells or tissue sections, is imaged in its entirety, and also its state analyzed, since, because of the specificity of the stainability of for example certain proteins or protein complexes, the actual fluorescence microscopy does not provide any information on this.

By contrast with the classic DIC, the proposed contrast method is not interference-based. This results in a higher potential for the optical cutting, that is to say the representation of contrast only from the depth of field region of the objective. In the case of the classic DIC, the phase difference of the partial beam paths separated in the polarization is accumulated during the overall passage of the illumination radiation through the object, whereby undesired dark or light regions may occur in the contrast image.

In the case of the microscopy method according to the invention, the generated image information originates substantially from the depth of field region of the objective used, since the image data contained in the first images and in the second images are virtually identical in the greatly defocused case.

The microscopy method according to the invention, which may also be referred to as the phase-mask contrast method, is suitable, in particular, for imaging high-frequency phase changes on short linear scales, for example, of edges, outlines and/or filaments. Short linear scales in the object plane, for example in the object, or in the intermediate image become high spatial frequencies in the pupil because of the Fourier transform. The linear scale on which phase changes are shown exaggerated depends in the case of the given optical system, for example the magnification and the numerical aperture, mainly on the optical gradient in the objective pupil, and can consequently also be adapted to different circumstances.

BRIEF DESCRIPTION OF THE DRAWINGS

The invention is explained in more detail below on the basis of exemplary embodiments and figures. In the figures.

DETAILED DESCRIPTION OF THE DRAWINGS

In the figures, the same elements are provided with the same reference numerals.

Figure 1:
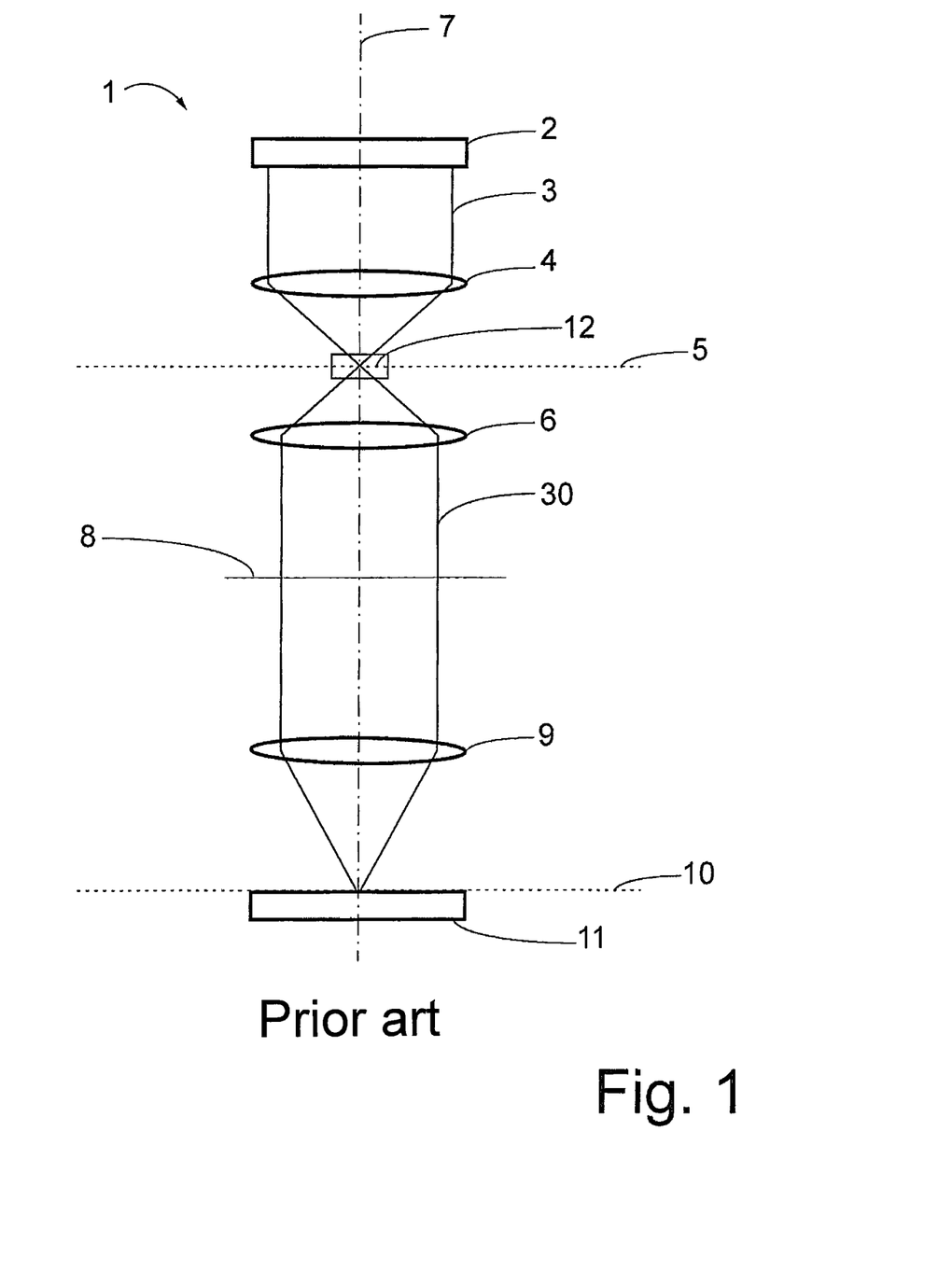
FIG. 1 is a schematic representation of a microscope according to the prior art that is suitable for producing a contrast image.

A microscope 1 designed according to the prior art for producing a contrast image is represented in FIG. 1 and has a light source 2 for providing an illumination radiation 3, a condenser 4 for focusing the illumination radiation 3 in an object plane 5, an objective unit 6 for collecting and imaging object radiation 30 obtained from the object plane 5 in the direction of an optical axis 7 of the microscope 1 in an image-side pupil 8, an imaging unit 9 for imaging the object radiation 30 in an image plane 10 and an acquisition unit 11 for the spatially resolved acquisition of image data in the image plane 10. The image data are brought about by the object radiation 30, because of the illumination radiation 3 passing through an object 12 that is optionally present in the object plane 5, and also because of it passing through the beam path of the microscope 1 in the image plane 10, as intensities.

Figure 2:
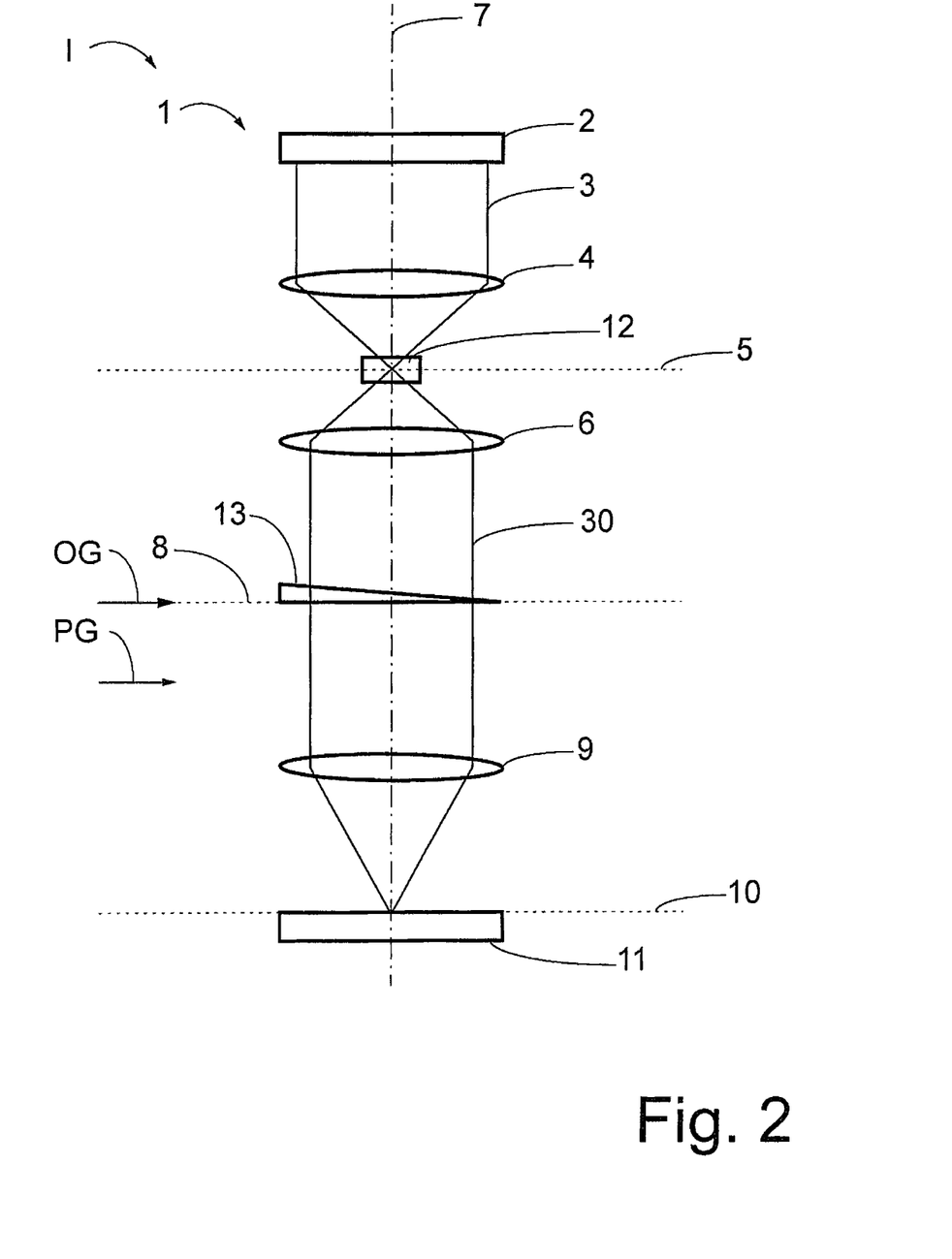
FIG. 2 is a schematic representation of a first exemplary embodiment of a microscope according to the invention.

A first exemplary embodiment of a microscope 1 according to the invention shown in FIG. 2 has the technical elements that are specified in relation to FIG. 1. In addition, a phase mask 13 is arranged in the pupil 8.

The phase mask 13 is formed as a wedge from a material that is transparent to the illumination radiation 3, such as for example glass, and has an optical gradient OG (symbolized by an arrow), which runs transversely in relation to the optical axis 7 and is brought about by the change in the thickness of the phase mask 13. Depending on the point of incidence on the phase mask 13, the illumination radiation 3 has to pass along paths of different lengths through the phase mask 13. By the effect of the optical gradient OG, a phase gradient PG (likewise symbolized by an arrow) of the illumination radiation 3 that has passed through the phase mask 13 (object radiation 30) is produced or can be produced.

The microscope 1 with the phase mask 13 in the pupil 8 represents a first configuration I of the microscope 1.

The phase mask 13 can be removed from the beam path, so that, with the phase mask 13 removed, there is a second configuration II of the microscope 1 (not shown).

Figures 3A, 3B:
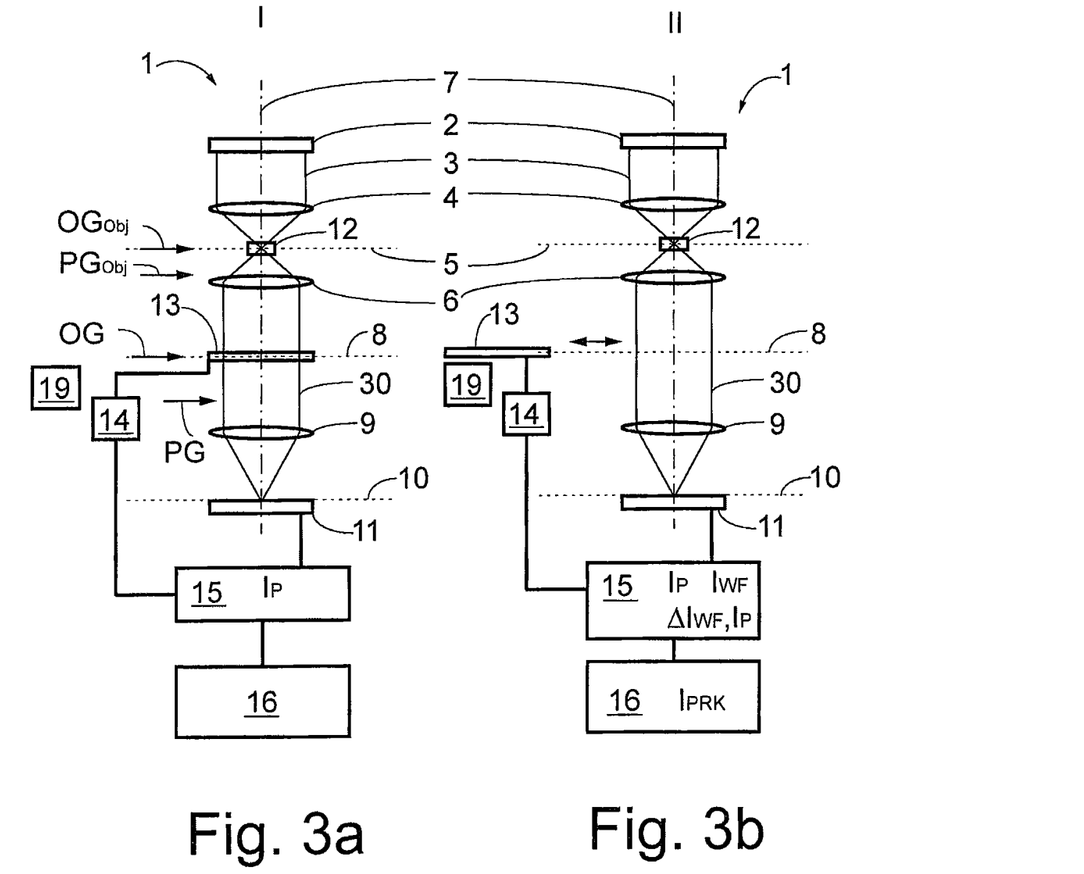
FIG. 3a is a schematic representation of a second exemplary embodiment of a microscope according to the invention in a first configuration.
FIG. 3b is a schematic representation of the second exemplary embodiment of the microscope according to the invention in a second configuration.

In order to introduce the phase mask 13 in the pupil 8 into the beam path of the microscope 1 or remove it from the beam path, in a second exemplary embodiment of the microscope 1 there is an infeeding device 14, as shown in FIGS. 3a and 3b.

There is also a changing device 19, in which a number of phase masks 13 not shown any more specifically are held or can be held. The phase masks 13 are individually selectable and a respectively selected phase mask 13 can be moved in and out of the pupil 8 by means of the infeeding device 14.

The infeeding device 14 and the changing device 19 are in connection with an evaluation unit 15 and can be controlled by it.

The evaluation unit 15 is also in connection with the acquisition unit 11, in order to receive image data acquired by the acquisition unit 11 assigned to acquisition times and/or acquisition time periods.

The evaluation unit 15 is configured in such a way that differences $\Delta\ I_P$, $I_{WF}$, for example absolute differences, between image data of different images can be determined by it. The image data are in this case image data of a first image $I_P$, which have been acquired with the first configuration I (FIG. 3a) of the microscope 1, and also image data of a second image $I_{WF}$, which have been acquired with the second configuration II (FIG. 3b) of the microscope 1.

The image data of the first image $I_P$ represent an acquired data set of image data, whereas the image data of the second image $I_{WF}$ can be used as a reference data set.

The evaluation unit 15 is also in connection with a display 16, by means of which the image data of the first image $I_P$, the image data of the second image $I_{WF}$ and/or image data of a contrast image $I_{PRK}$ of the object 12 provided in dependence on the determined differences $\Delta\ I_p$, $I_{WF}$ are displayed or can be displayed.

In the second configuration II, shown in FIG. 3b, the phase mask 13 has been removed from the beam path and moved to the changing device 19.

Figure 4:
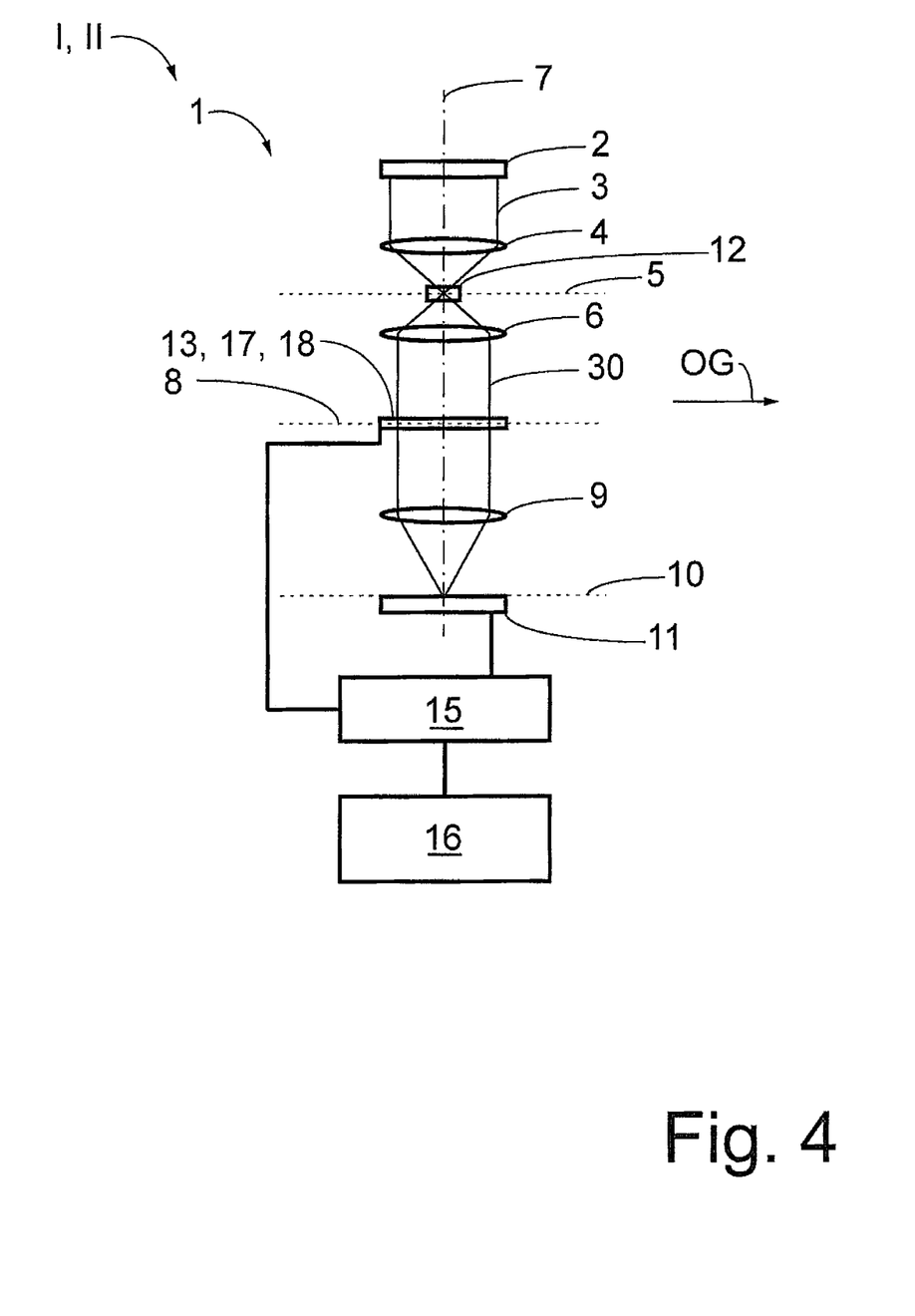
FIG. 4 is a schematic representation of a third exemplary embodiment of a microscope according to the invention.

A third exemplary embodiment of the microscope 1 according to the invention is shown in FIG. 4. The phase mask 13 is arranged in the pupil 8 and in the beam path and remains there in the first and second configurations I and II of the microscope 1.

The phase mask 13 is realized by a liquid crystal element 17 or by a spatial light modulator 18, which can respectively be operated at least in one operating state in which they bring about an optical gradient OG transversely in relation to the optical axis 7. The liquid crystal element 17 or the spatial light modulator 18 can also be operated in an operating state in which no optical gradient OG is brought about and the effect as a phase mask 13 is stopped almost completely or completely. The phase mask 13 can be activated by the evaluation unit 15.

In further possible embodiments of the microscope 1, the phase mask 13 is formed by mirror surfaces 20.1 that are tilted with respect to one another of at least two mirrors 20. In the beam path of the microscope 1 there are further objectives 23, which consist in each case of at least one optical lens.

Figure 5:
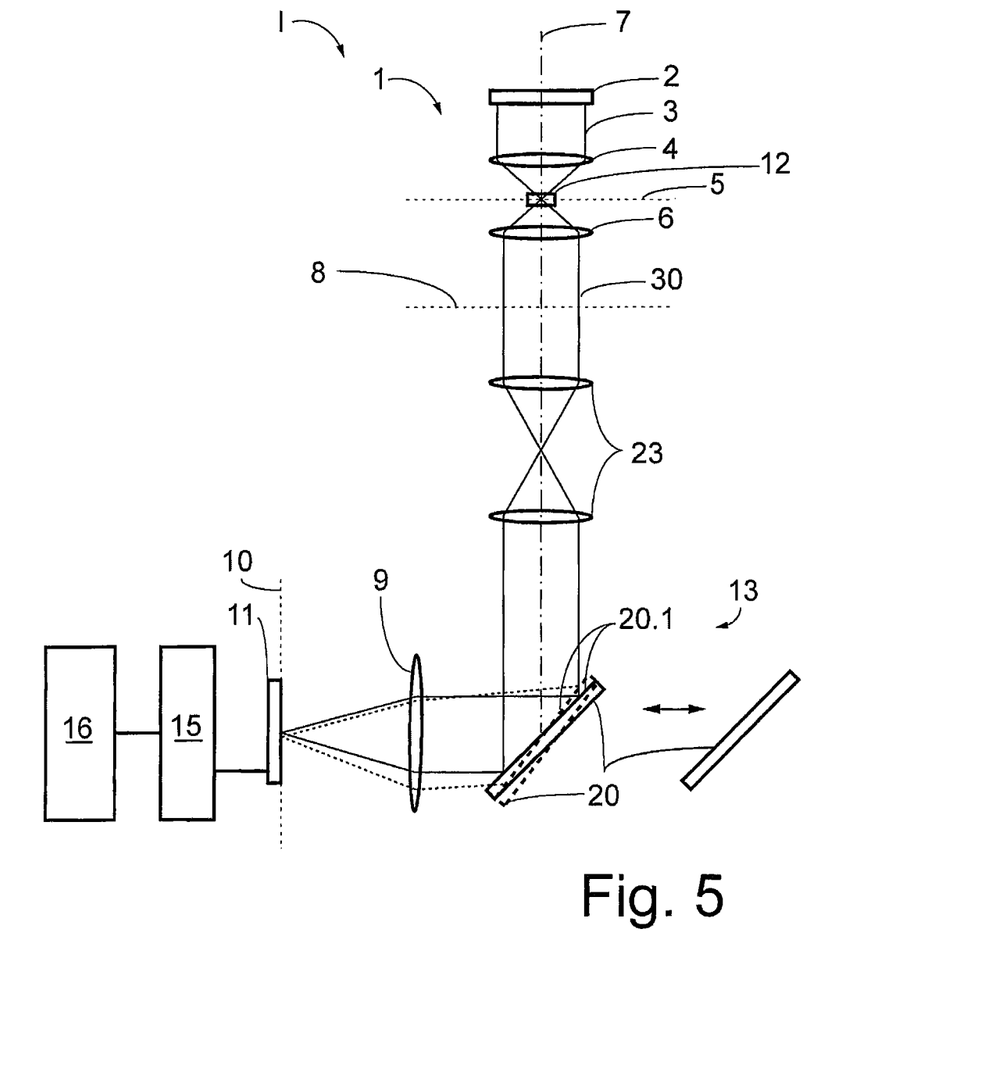
FIG. 5 is a schematic representation of a fourth exemplary embodiment of a microscope according to the invention.

In FIG. 5, such an arrangement is shown as a fourth exemplary embodiment of the microscope 1. In the first configuration I, the object radiation 30 reaches the mirror surfaces 20.1 of the mirrors 20 that have been tilted with respect to one another. As a result of the differently inclined mirror surfaces 20.1, the object radiation 30 is reflected along two beam paths that are offset with respect to one another to the imaging unit 9 and are imaged by the latter as second partial images that are offset with respect to one another in the image plane 10 and on the acquisition unit 11. The first image $I_P$ can be acquired by the acquisition unit 11 (see FIGS. 3a and 3b).

In order to be able to acquire the second image $I_{WF}$ (see FIGS. 3a and 3b) by means of the second configuration II, the mirrors 20 with the tilted mirror surfaces 20.1 can be exchanged for a mirror 20, in particular a plane mirror 20 (indicated by a double-headed arrow). The object radiation 30 is only reflected in one beam path to the imaging unit 9 by the plane mirror 20.

In an alternative embodiment, the mirror surfaces 20.1 can be tilted with respect to one another by means of an activatable actuation system. In order to acquire the second image $I_{WF}$, the mirror surfaces 20.1 can be aligned in relation to one another, so that they are for example aligned in a common plane.

Figure 6:
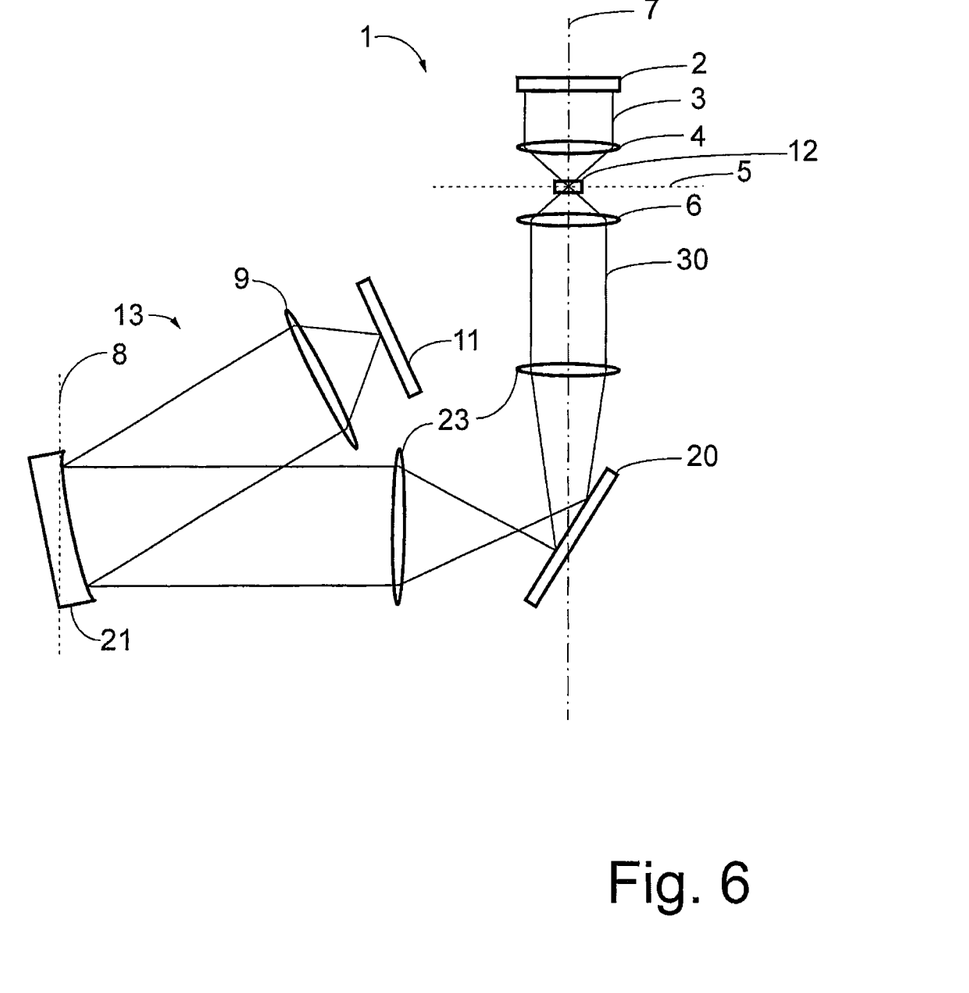
FIG. 6 is a schematic representation of a fifth exemplary embodiment of a microscope according to the invention.

A fifth exemplary embodiment of the microscope 1 is shown in FIG. 6 with a deformable mirror 21 as a phase mask 13 in a pupil 8. The object radiation 30 is reflected onto the deformable mirror 21 by way of a mirror 20 and a further objective 23. Depending on the state of activation of the deformable mirror 21, the beam path between it and the acquisition unit 11 is diverted, so that the first configuration I, the second configuration II or a further configuration of the microscope 1 can be brought about by means of the activation of the deformable mirror 21.

In possible embodiments, the phase mask 13 is divided into subregions 13.1, at least one of the subregions 13.1 having an optical gradient OG that deviates in comparison with the other subregions 13.1.

In FIGS. 7a to 7d, symmetrically divided phase masks 13 are shown in a plan view.

The profiles of the optical gradients OG of the respective subregions 13.1 are symbolized by arrows.

Figure 7A:
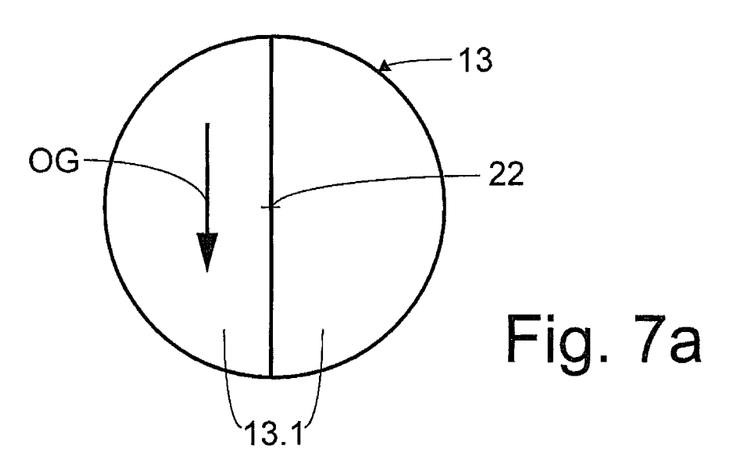
FIG. 7a is a schematic representation of a first exemplary embodiment of a phase mask in a plan view.

In one embodiment of the phase mask 13, one of the two subregions 13.1 has an optical gradient OG (FIG. 7a). The phase mask 13 is introduced into the beam path in the pupil 8 in such a way that the beam path in the pupil 8 is half covered.

In a possible embodiment that is not shown, in the middle of the phase mask 13 there is a hole, which is surrounded by a subregion 13.1 that has an optical gradient OG.

Figure 7B:
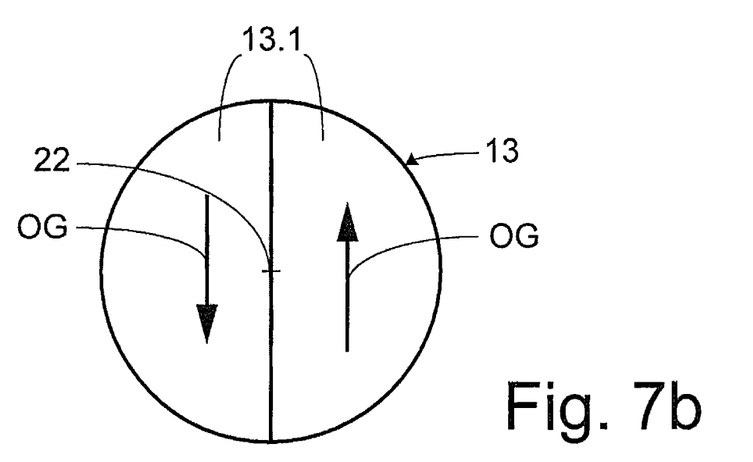
FIG. 7b is a schematic representation of a second exemplary embodiment of a phase mask in a plan view.

FIG. 7b shows a phase mask 13 with opposing and symmetrically running optical gradients OG. In this case, the centroid of the optical gradients OG in the first image in relation to the second image is retained.

Figure 7C:
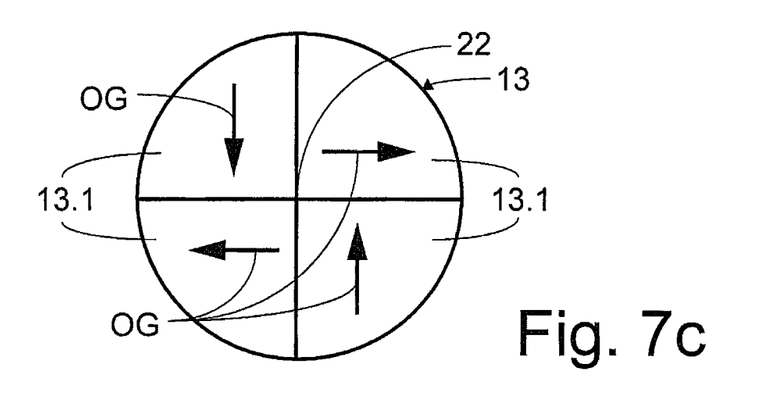
FIG. 7c is a schematic representation of a third exemplary embodiment of a phase mask in a plan view.

A phase mask 13 divided into four subregions 13.1 is shown in FIG. 7c. The optical gradients OG of the subregions 13.1 respectively arranged diagonally in relation to one another run oppositely to one another. Each of the optical gradients OG also runs in a different direction. By this embodiment of the phase mask 13, the forming of the phase gradient PG in two directions orthogonal to one another can be brought about, whereby the formation of a "shearing direction" is avoided. This is not possible for the half pupil contrast method or for DIC. EP 2 645 146 B1 therefore shows for example solutions for many paired half-pupil diaphragms that are arranged on a wheel and are introduced sequentially, with however an increase in the number of images to be recorded.

Figure 7D:
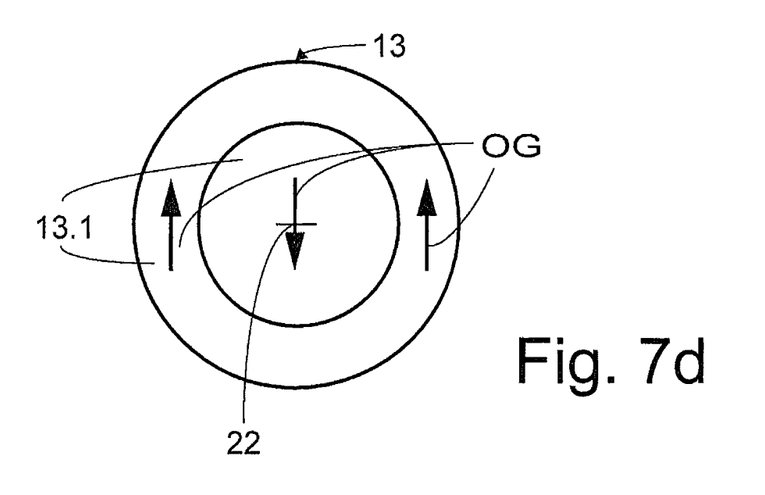
FIG. 7d is a schematic representation of a fourth exemplary embodiment of a phase mask in a plan view.

FIG. 7d schematically shows a phase mask 13 of which the subregions 13.1 consist of an outer circular ring and an inner circle, the optical gradients OG of which are formed oppositely to one another.

In further possible embodiments of the phase mask 13, the subregions 13.1 may be formed as sectors of a circle or of a circular ring.

It is also possible that the subregions 13.1 are realized as combinations of sectors, one or more circles and/or one or more circular rings.

All of the embodiments of the phase mask 13 can be rotatable about an axis of rotation 22 running parallel to the optical axis 7, and consequently also about the optical axis 7 itself. In FIG. 7d, the axis of rotation 22 is identified by the point of intersection of a horizontal line, shown for better understanding, with the middle arrow symbolizing an optical gradient OG.

Figure 8A:
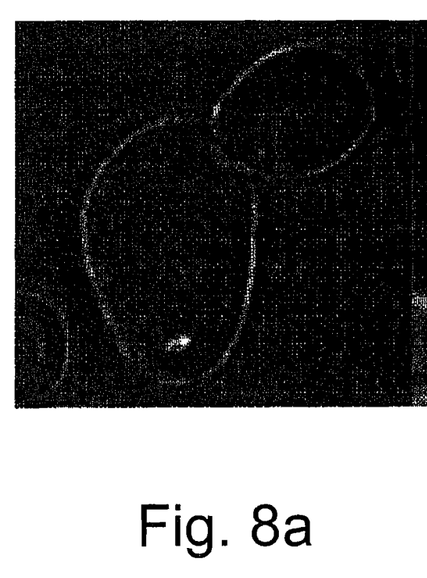
FIG. 8a is a contrast image of starch grains of a potato cell obtained by means of a microscopy method according to the invention.
Figure 8B:
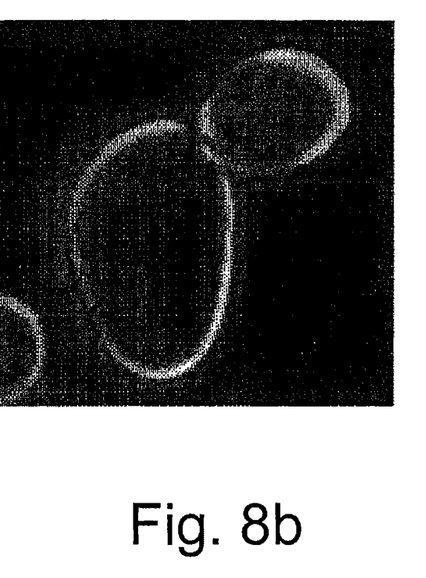
FIG. 8b is a contrast image of the starch grains obtained by means of a microscopy method according to the prior art.

The contrast image $I_{PRK}$ of the starch grains of a potato cell obtained by means of a microscopy method according to the prior art is shown in FIG. 8a. FIG. 8b is a detail of a contrast image $I_{PRK}$ of starch grains of the potato cell obtained by means of the microscopy method according to the invention.

The better sectioning made possible by means of the invention is illustrated in FIGS. 8a and 8b. Two planes of a z stack from a section of a potato tuber taken by the microscopy method according to the invention (FIG. 8a) and the prior art (FIG. 8b) are shown in phase contrast. The starch grains partly arranged one over the other are in the case of the conventional phase contrast shown in FIG. 8a visible in all the planes of FIG. 8b, whereas in the contrast image $I_{PRK}$ of FIG. 8a produced by means of the microscopy method according to the invention only the edges of the starch grains lying in the depth of field region are contrasted.

The embodiment of the microscopy method according to the invention is explained on the basis of FIGS. 3a and 3b.

By means of the microscope 1 in the first configuration I, image data of a first image $I_P$ of the object 12 arranged in the object plane 5 are acquired. For this purpose, the illumination radiation 3 is provided by the light source 2 and focused in the object plane 5. Those portions of the illumination radiation 3 that pass through the object 12 (object radiation 30) are displaced with respect to their phase as a result of the optical gradient $OG_{Obj}$ of the object 12, so that a phase gradient $PG_{Obj}$ is formed for the object radiation 30.

The phase mask 13 arranged in the pupil 8 brings about the phase gradient PG of the object radiation 30, the specific form of which being dependent on the design of the phase mask 13, the optical gradient $OG_{Obj}$ and the phase gradient $PG_{Obj}$ and also the at least one optical gradient OG of the phase mask 13.

The object radiation 30 is imaged in the image plane 10 by means of the imaging unit 9 and acquired in a spatially resolved form as image data of the first image $I_P$ by the acquisition unit 11.

The phase gradient $PG_{Obj}$ brought about by the optical gradient $OG_{Obj}$ of the object 12 leads to a displacement of the orders of diffraction of the object 12 in the Fourier plane that is proportional to the phase gradient $PG_{Obj}$. If a phase gradient PG is brought about in a Fourier plane, in particular in the pupil 8, which may be in particular an objective pupil, for example by means of the phase mask 13 in the half pupil 8, a part of the diffraction pattern that is proportional to the phase gradient $PG_{Obj}$ is additionally exposed to the phase gradient PG, and a part of the diffraction pattern that is likewise proportional to the phase gradient $PG_{Obj}$ of the other half of the pupil 8 is not exposed. The phase gradient PG has the effect that the image information passing through the phase gradient PG is imaged on the acquisition unit 11 offset perpendicularly in relation to the phase gradient PG. An image $I_P$ consisting of two partial images offset slightly in relation to one another is therefore obtained on the acquisition unit 11, formed for example as an image sensor.

The determination of differences $\Delta I_P, I_{WF}$ between the uninfluenced image $I_{WF}$ and the image $I_P$ consequently leads to an image contrast represented by image data of a contrast image $I_{PRK}$ that is proportional to the portion of the orders of diffraction displaced in the pupil 8, and consequently proportional to the local phase gradient $PG_{Obj}$ in the object plane 5.

Subsequently, the second configuration II of the microscope 1 is brought about, in that the infeeding device 14 is activated by means of the evaluation unit 15 and the phase mask 13 is removed from the pupil 8, in particular is moved out from it, so that the beam path is no longer influenced by the phase mask 13.

In the second configuration II, a wide field image of the object 12 is recorded and is stored as image data of a second image $I_{WF}$, in particular as a reference data set, by the evaluation unit 15.

In further embodiments of the microscopy method, first the image data of the second images $I_{WF}$ are acquired by means of the second configuration II and subsequently the image data of the first images $I_P$ are acquired by means of the first configuration I.

For producing the contrast image $I_{PRK}$, the difference $\Delta I_P, I_{WF}$ between the image data of the first image $I_P$ and the image data of the second image $I_{WF}$ is determined. In dependence on the determined differences $\Delta I_P, I_{WF}$ or the determined differences $\Delta I_P, I_{WF}$, the image data of the contrast image $I_{PRK}$ are determined.

In particular, the first image $I_P$ may be subtracted from the second image $I_{WF}$ and possibly normalized. Obtained as the result is the contrast image $I_{PRK}$ sensitive to the phase gradient PG.

In this case, the differences $\Delta I_P, I_{WF}$ can be used directly as image data of the contrast image $I_{PRK}$.

The differences $\Delta I_P, I_{WF}$ may also be computed with weighting factors and/or function values, for example of point spread functions.

The contrast image $I_{PRK}$ is in particular sensitive to linear scales that are proportional to the spacing of the partial images.

A normalizing, as is necessary in the case of half pupil contrast, is not required, since the undisturbed transmitted-light image (second image $I_{WF}$) is already available and does not have to be synthesized from the two half-pupil images. This presupposes that the phase mask 13 in the pupil 8 only influences the phase position.

If the transmission is also influenced by the phase mask 13, the image intensities can be suitably normalized, and for example brought in relation to the average intensity of the second image $I_{WF}$ as follows:

$$I_{PRK} = I_{WF} - \frac{\overline{I_{WF}}}{\overline{I_P}} * I_P.$$

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE NUMERALS

1 Microscope
2 Light source
3 Illumination radiation
4 Condenser
5 Object plane
6 Objective unit
7 Optical axis
8 Objective pupil
9 Imaging unit
10 Image plane
11 Acquisition unit
12 Object
13 Phase mask
13.1 Partial region (of the phase mask 13)
14 Infeeding device
15 Evaluation unit
16 Display
17 Liquid crystal element
18 Spatial light modulator
19 Changing device
20 Mirror
20.1 Mirror surface
21 Deformable mirror
22 Axis of rotation
23 Further objectives
30 Object radiation
I First configuration
II Second configuration
OG Optical gradient
$OG_{Obj}$ Optical gradient (of the object 12)
PG Phase gradient
$PG_{Obj}$ Phase gradient (of the object 12)
$\Delta\ I_{WF}, I_P$ Absolute difference
$I_P$ First image
$I_{WF}$ Second image
$I_{PRK}$ Contrast image

What is claimed is:

1. A microscopy method comprising,
   directing illumination radiation through an object arranged in an object plane of a microscope, in order to image the object by means of an object radiation obtained from the object plane,
   acquiring image data of a first image of the object with a first configuration of the microscope,
   acquiring image data of a second image of the object with a second configuration of the microscope,
   determining differences between the image data of the first image and the second image,
   providing, in dependence on the determined differences, image data of a contrast image of the object,
   arranging, in a pupil of the microscope, in the first configuration, a phase mask that has at least one optical gradient transversely in relation to the optical axis of the microscope, by the effect of which a phase gradient of the object radiation is produced or can be produced, and,
   removing the phase mask from the pupil in the second configuration.

2. The microscopy method as claimed in claim 1, wherein, with the second configuration, image data of a wide field image are acquired.

3. The microscopy method as claimed in claim 1, further comprising normalizing and/or a scaling of the image data of the first and second images.

4. The microscopy method as claimed in claim 1, wherein said inverse contrast image is produced in dependence on the determined differences of the image data.

5. The microscopy method as claimed in claim 1, wherein said optical gradient of the phase mask is selected in dependence on optical properties of the object.

6. The microscopy method as claimed in claim 1, wherein said acquisitions of the image data are performed by means of the first configuration and second configuration in alternation with a number of acquisition processes that are carried out with a third configuration of the microscope.

7. The microscopy method as claimed in claim 1, further comprising carrying out analysis of the state of the object on the basis of the image data of the contrast image, wherein at least one subset of the image data of the contrast image is compared with target data.

8. A microscope comprising a light source for providing an illumination radiation, a condenser focusing the illumination radiation in an object plane, an objective unit collecting and imaging object radiation obtained from the object plane in the direction of an optical axis of the microscope in an image-side pupil; an imaging unit configured for imaging the object radiation obtained from the object plane in an image plane, an acquisition unit for the spatially resolved acquisition of the image data in the image plane, and a phase mask arranged in the pupil, or an infeeding device for moving the phase mask in and out of the pupil, said phase mask having at least one optical gradient, which is formed transversely in relation to the optical axis and by the effect of which a phase gradient of the object radiation is, produced or can be, produced.

9. The microscope as claimed in claim 8, further comprising an evaluation unit for evaluating the image data acquired by the acquisition unit, said evaluation unit configured for determining differences of image data between at least one data set acquired with the phase mask arranged in the pupil and a reference data set acquired without the phase mask arranged in the pupil.

10. The microscope as claimed in claim 8, wherein said phase mask is divided into subregions and wherein at least one of the subregions has an optical gradient that deviates in comparison with the other subregions.

11. The microscope as claimed in claim 8, wherein said phase mask is formed by a liquid crystal element.

12. The microscope as claimed in claim 8, wherein said phase mask is formed by a spatial light modulator.

13. The microscope as claimed in claim 8, wherein said phase mask is rotatable about an axis of rotation running parallel to the optical axis.

14. The microscope as claimed in claim 8, wherein said phase mask is formed by tilted mirror surfaces of at least two mirrors and/or by a deformable mirror.

* * * * *

UNITED STATES PATENT AND TRADEMARK OFFICE
CERTIFICATE OF CORRECTION

PATENT NO. : 10,895,732 B2  
APPLICATION NO. : 15/774493  
DATED : January 19, 2021  
INVENTOR(S) : Thomas Kalkbrenner Page 1 of 1

It is certified that error appears in the above-identified patent and that said Letters Patent is hereby corrected as shown below:

On the Title Page

Item (72) Inventors, Line 8  now reads: "Thomas Kalkbrenner, Jena (DE)"  
should read -- Dr. Thomas Kalkbrenner, Jena (DE) --

In the Claims

Column 12, Line 49  now reads: "radiation is, produced or can be, produced."  
should read -- radiation is, or can be, produced. --

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*